No. 718,680. PATENTED JAN. 20, 1903.
B. TULLY.
BARREL FILTER.
APPLICATION FILED JUNE 10, 1902.
NO MODEL.
2 SHEETS—SHEET 2.
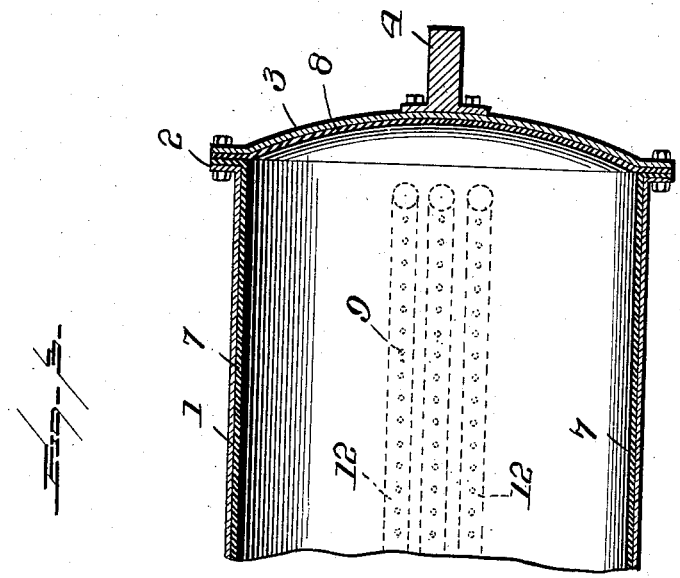
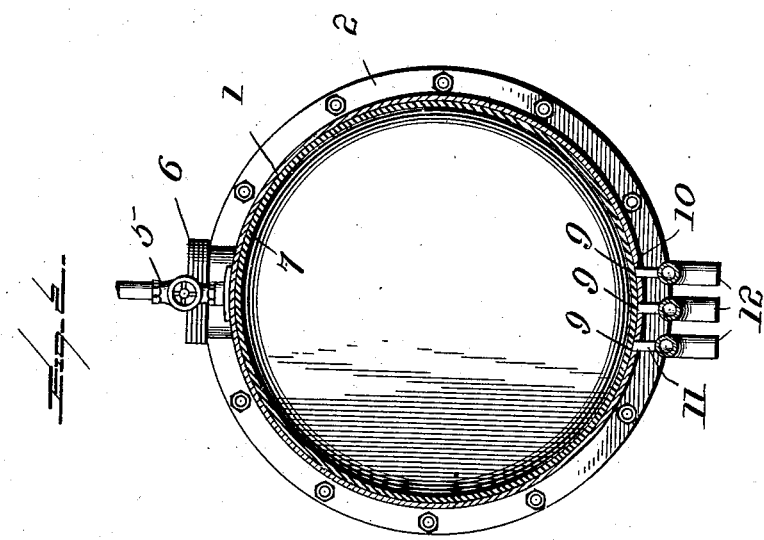
WITNESSES: INVENTOR
BY
Attorney

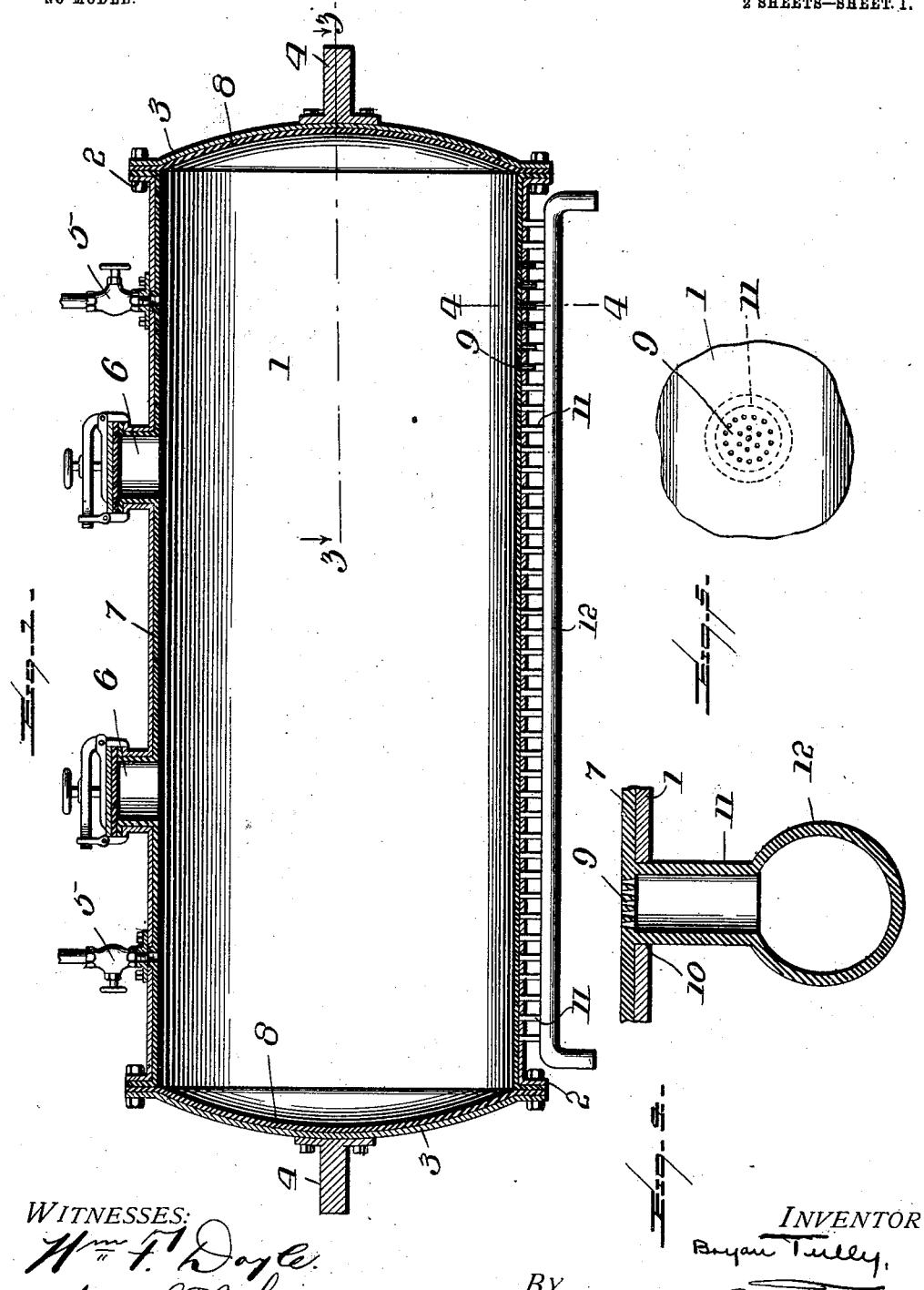

UNITED STATES PATENT OFFICE.

BRYAN TULLY, OF ELKTON, COLORADO, ASSIGNOR TO F. M. WOODS, OF TELLER COUNTY, COLORADO.

BARREL-FILTER.

SPECIFICATION forming part of Letters Patent No. 718,680, dated January 20, 1903.

Application filed June 10, 1902. Serial No. 110,961. (No model.)

*To all whom it may concern:*

Be it known that I, BRYAN TULLY, a citizen of the United States, residing at Elkton, in the county of Teller and State of Colorado, have invented certain new and useful Improvements in Barrel-Filters; and I do hereby declare the following to be a full, clear, and exact description of the invention, such as will enable others skilled in the art to which it appertains to make and use the same.

This invention relates to barrel-filters for filtering auriferous and other precious-metal solutions—such, for example, as in carrying out the well-known chlorination process and for similar purposes—and it has for its objects to provide a barrel-filter of the character referred to wherein the entire interior of the barrel is unobstructed, to provide such a barrel with a lining which itself will constitute the filter, to provide novel means for connecting the launder pipe or pipes with the filtering mechanism, to effect an economy in the original construction of such filters and increase their durability, as well as facilitating and rendering less expensive the operation of repairing or replacing the lining of the barrel, and, finally, to improve and simplify the construction and render more efficient the operation of this class of filters generally.

To these several ends my invention consists in the features and in the construction, combination, and arrangement of parts hereinafter described, and particularly pointed out in the claims following the description, reference being had to the accompanying drawings, forming a part of this specification, wherein—

Figure 1 is a longitudinal vertical sectional view of my improved barrel filter. Fig. 2 is a transverse sectional view thereof. Fig. 3 is a horizontal sectional view taken on the line 3 3 of Fig. 1. Fig. 4 is an enlarged sectional view taken on the line 4 4 of Fig. 1, and Fig. 5 is an enlarged detail view illustrating one of the filter-outlets as viewed from the interior of the filter-barrel.

Referring to the drawings, the numeral 1 indicates the filter-barrel, consisting of a horizontal cylinder of any desired dimensions and constructed from any suitable material, said cylinder being preferably formed of metal and provided at its opposite ends with annular laterally-projecting flanges 2, to which are bolted heads 3. The heads 3 are provided with trunnions 4, which are journaled in suitable bearings and are connected with suitable gearing and driving mechanism (not shown) for imparting to the barrel at suitable intervals a rotary movement about its horizontal longitudinal axis. The barrel 1 is provided with one or more valved inlets 5 for introducing fluid under pressure and also with normally closed manholes 6 for furnishing ready access to the interior of the barrel and for the introduction of the chlorin or acid and the ore to be treated. The cylinder 1 and heads 3 are provided with lead linings 7 and 8, that operate to resist the action of the chlorin or acid, the edges of said linings being tightly clamped between the flanges 2 and the heads 3, as clearly shown in the drawings. Formed in the lead lining 7, constituting the inner circumference of the cylinder 1, is a longitudinal row (one or more) of filters each comprising a circularly-arranged series of minute perforations 9, formed in the lead lining, a circular aperture 10 being formed in the metallic body 1 of the barrel coincident with each series of such perforations.

The numeral 11 indicates a plurality of short pipes, one for each aperture 10, which are preferably formed of lead and are connected at their outer ends to a pipe 12, known in the art as a "launder," said launder being also preferably formed of lead. The short lead pipes 11 are inserted in the apertures 10, formed in the cylinder 1, and are fused to the lead lining 7, and their outer ends may in like manner be connected to the launder 12.

The operation of my improved barrel-filter will be readily understood by those skilled in the art. The chlorin or acid and the ore are introduced into the barrel through the manholes and the latter closed, after which the barrel is rotated on its trunnions until the solid matter and the chlorin solution or the like are thoroughly mixed. The movement of the barrel is then arrested, this operation being effected when the launder (or launders) is in its lowest position. The chlorin solution or the like holding the metal in solution then passes out through the perforations 9, forming the filters, and is conveyed off by the pipes 11 to the launders 12, which latter, as fast as the solution is filtered, carries off the solution in any manner—such as by a trough or detachable connection, for example—to the leaching-tanks or other receptacles, as may be desired. The solid and other foreign portions of the solution are unable to pass through the minute perforations 9 in the lead lining forming the filters, and hence do not pass off to the launders with the chlorin and the metal held in solution therein.

I have shown the barrel provided with three launders, each connected to a plurality of filters or series of perforations 9, formed in the lead lining; but it will of course be manifest that any number of launders may be employed, and also each launder may communicate with the interior of the barrel by any desired number of filters and pipe connections 11.

An important feature of my invention consists in the fact that absolutely no part of the device is arranged within the leaden lining of the barrel, the filter-perforations 9 being formed directly in the lining itself, thereby greatly facilitating and cheapening the operation of repairing or replacing the lead lining, affording greater ease of access to the interior of the barrel, increasing the durability of the entire device, and effecting a considerable economy in the cost of its original construction. Furthermore, by means of such arrangement the solution comes into contact with nothing but lead from the time of its introduction into the barrel to the time it is discharged in the launders and there are no contained parts that have to be protected from the injurious action of the chlorin or acids.

Having described my invention, what I claim is—

1. A filter of the class described, comprising a rotatable barrel provided with an acid-proof lining arranged in intimate contact with the interior of the barrel for preventing the solvent coming in contact with the barrel, and filters formed in the body of the lining, said barrel being apertured at the points where the filters are located, substantially as described.

2. A filter of the class described, comprising a rotatable barrel provided with a lead lining, the body of the barrel being provided with outlets and the lining being perforated opposite said outlets, substantially as described.

3. A filter of the class described, comprising a rotatable barrel provided with a lead lining, the body of the barrel being provided with apertures and the lining being perforated opposite said apertures, a launder arranged on the exterior of the barrel and provided with a plurality of branch pipes, said branch pipes, at their inner ends, being fitted in said apertures and connected to the lead lining about said perforations, substantially as described.

4. A filter of the class described, comprising a rotatable barrel provided with a lead lining, the body of the barrel being provided with apertures and the lining being perforated opposite said apertures, a lead launder arranged on the exterior of the barrel and provided with a plurality of lead branch pipes, said branch pipes at their inner ends being fitted in said apertures and connected to the lead lining about said perforations, substantially as described.

5. A filter of the class described, comprising a rotatable barrel provided with a lead lining, a lead launder arranged on the exterior of the barrel, a plurality of laterally-projecting branch pipes, said pipes at one end being fused to the launder and at their ends extending through the shell or body of the barrel and fused to the lead lining, the lead lining being perforated at the points where the branch pipes are connected to it, substantially as described.

6. A filter of the class described, comprising a rotatable barrel provided with a lead lining, a launder arranged on the exterior of the barrel and parallel to the longitudinal axis of the latter, branch pipes connected at their outer ends to the launder and extending at their inner ends through the body of the barrel and united to the lead lining, said lead lining opposite the inner end of each of said branch pipes being provided with a circular series of perforations, substantially as described.

7. A filter of the class described, comprising a rotatable barrel provided with an acid-proof protective lining in direct contact with the interior of the barrel, and filters formed in the body of said lining, the said lining being impervious to the solution at all points excepting those wherein the filters are located, substantially as described.

8. A filter of the class described comprising a rotatable barrel, an acid-proof protective lining fitted within said barrel and in close contact with the interior thereof, filters formed in the body of the lining, said barrel being apertured opposite the filters, and a launder arranged exteriorly of the barrel and in communication with the filters, substantially as described.

9. A filter of the class described, a rotatable cylindrical barrel, and an acid-proof protective lining arranged in contact with the barrel, a filter located within the body of said lining and a launder arranged exteriorly of the barrel and connected with said filter, substantially as described.

10. A filter of the class described, comprising a cylindrical rotatable barrel provided with an acid-proof lining closely conforming to the interior of the barrel and provided with a plurality of circular series of perforations, pipes, secured at their inner ends to the lining about the circular series of perforations, and a launder arranged on the exterior of the barrel and connected to all of said pipes, for the purpose specified.

In testimony whereof I affix my signature in presence of two witnesses.

BRYAN TULLY.

Witnesses:
 A. W. KINNE,
 GEO. ADAMS.